United States Patent
Rowlands et al.

(10) Patent No.: US 11,805,039 B1
(45) Date of Patent: Oct. 31, 2023

(54) METHOD AND APPARATUS FOR DETECTING DEGRADED NETWORK PERFORMANCE

(71) Applicant: Dell Products L.P., Round Rock, TX (US)

(72) Inventors: Scott Rowlands, Cumming, GA (US); Krishna Deepak Nuthakki, Bangalore (IN); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/157,255

(22) Filed: Jan. 20, 2023

(51) Int. Cl.
*H04L 43/0864* (2022.01)
*H04L 67/1097* (2022.01)

(52) U.S. Cl.
CPC ...... *H04L 43/0864* (2013.01); *H04L 67/1097* (2013.01)

(58) Field of Classification Search
CPC .................. H04L 43/0864; H04L 67/1097
See application file for complete search history.

(56) References Cited

U.S. PATENT DOCUMENTS

| | | | | |
|---|---|---|---|---|
| 8,060,650 | B2 * | 11/2011 | Jansz | G06F 11/3485 709/227 |
| 2006/0107089 | A1 * | 5/2006 | Jansz | G06F 11/3485 714/5.1 |
| 2010/0325147 | A1 * | 12/2010 | Shogaki | G06F 16/3325 707/769 |
| 2019/0310931 | A1 * | 10/2019 | Ocariza, Jr. | G06F 11/3466 |
| 2020/0021654 | A1 * | 1/2020 | Rao | H04L 67/101 |

FOREIGN PATENT DOCUMENTS

| | | | | |
|---|---|---|---|---|
| JP | 2010231368 A | * | 10/2010 | |
| JP | 2019117476 A | * | 7/2019 | |
| JP | 2022038408 A | * | 3/2022 | |
| KR | 101686658 B1 | * | 12/2016 | |
| WO | WO-2007135959 A1 | * | 11/2007 | ........... H04L 1/1809 |
| WO | WO-2015092873 A1 | * | 6/2015 | ........... G06F 9/5066 |

* cited by examiner

*Primary Examiner* — Shean Tokuta
(74) *Attorney, Agent, or Firm* — DALY, CROWLEY MOFFORD & DURKEE, LLP

(57) ABSTRACT

A method, comprising: receiving a plurality of first response times, each of the plurality of first response times corresponding to a different one of a plurality of first network paths between a first host device and the first storage array, the plurality of first response times being received from the first host device; receiving a plurality of second response times, each of the plurality of second response times corresponding to a different one of a plurality of second network paths between a second host device and the first storage array, the plurality of second response times being received from the second host device; and processing the plurality of first response times and the plurality of second response times, wherein the plurality of first network paths and the plurality of second network paths are part of a communications network.

20 Claims, 7 Drawing Sheets

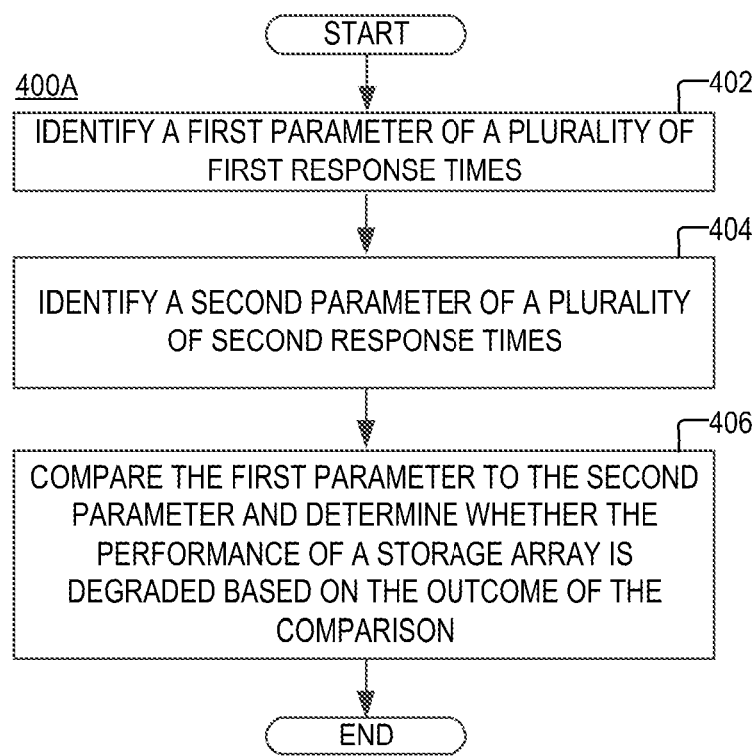

METHOD AND APPARATUS FOR DETECTING DEGRADED NETWORK PERFORMANCE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving a plurality of first response times, each of the plurality of first response times corresponding to a different one of a plurality of first network paths between a first host device and the first storage array, the plurality of first response times being received from the first host device; receiving a plurality of second response times, each of the plurality of second response times corresponding to a different one of a plurality of second network paths between a second host device and the first storage array, the plurality of second response times being received from the second host device; and processing the plurality of first response times and the plurality of second response times, wherein the plurality of first network paths and the plurality of second network paths are part of a communications network.

According to aspects of the disclosure, a storage array is provided, comprising: a memory; at least one processor that is operatively coupled to the memory, the at least one processor being configured to perform the operations of: receiving a plurality of first response times, each of the plurality of first response times corresponding to a different one of a plurality of first network paths between a first host device and the first storage array, the plurality of first response times being received from the first host device; receiving a plurality of second response times, each of the plurality of second response times corresponding to a different one of a plurality of second network paths between a second host device and the first storage array, the plurality of second response times being received from the second host device; and processing the plurality of first response times and the plurality of second response times, wherein the plurality of first network paths and the plurality of second network paths are part of a communications network.

According to aspects of the disclosure, a non-transitory computer-readable medium storing one or more processor-executable instructions, which, when executed by one or more processors of a first storage array, cause the first storage array to perform the operations of: receiving a plurality of first response times, each of the plurality of first response times corresponding to a different one of a plurality of first network paths between a first host device and the first storage array, the plurality of first response times being received from the first host device; receiving a plurality of second response times, each of the plurality of second response times corresponding to a different one of a plurality of second network paths between a second host device and the first storage array, the plurality of second response times being received from the second host device; and processing the plurality of first response times and the plurality of second response times, wherein the plurality of first network paths and the plurality of second network paths are part of a communications network.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4A is a flowchart of an example of a process, according to aspects of the disclosure;

DETAILED DESCRIPTION

A storage array may be connected to host devices via a communications network. When a host device experiences high I/O latency, this may be attributable to either a degraded performance of the communications network or a degraded performance of the storage array. The present disclosure provides different methods for differentiating between degraded network performance and degraded storage array performance. The methods may be used to diagnose high I/O latency or poor QoS as either being caused by degraded network performance or degraded storage array performance. When a user experiences a problem with a storage array, a large number of manhours may be spent on debugging the storage array only to find out at the end that the problem was with the network that connected the user to the storage array. In this regard, the methods are advantageous because they can reduce the cost of debugging user problems by helping direct the debugging process in the direction of the true cause of the user problems.

Figure 1:
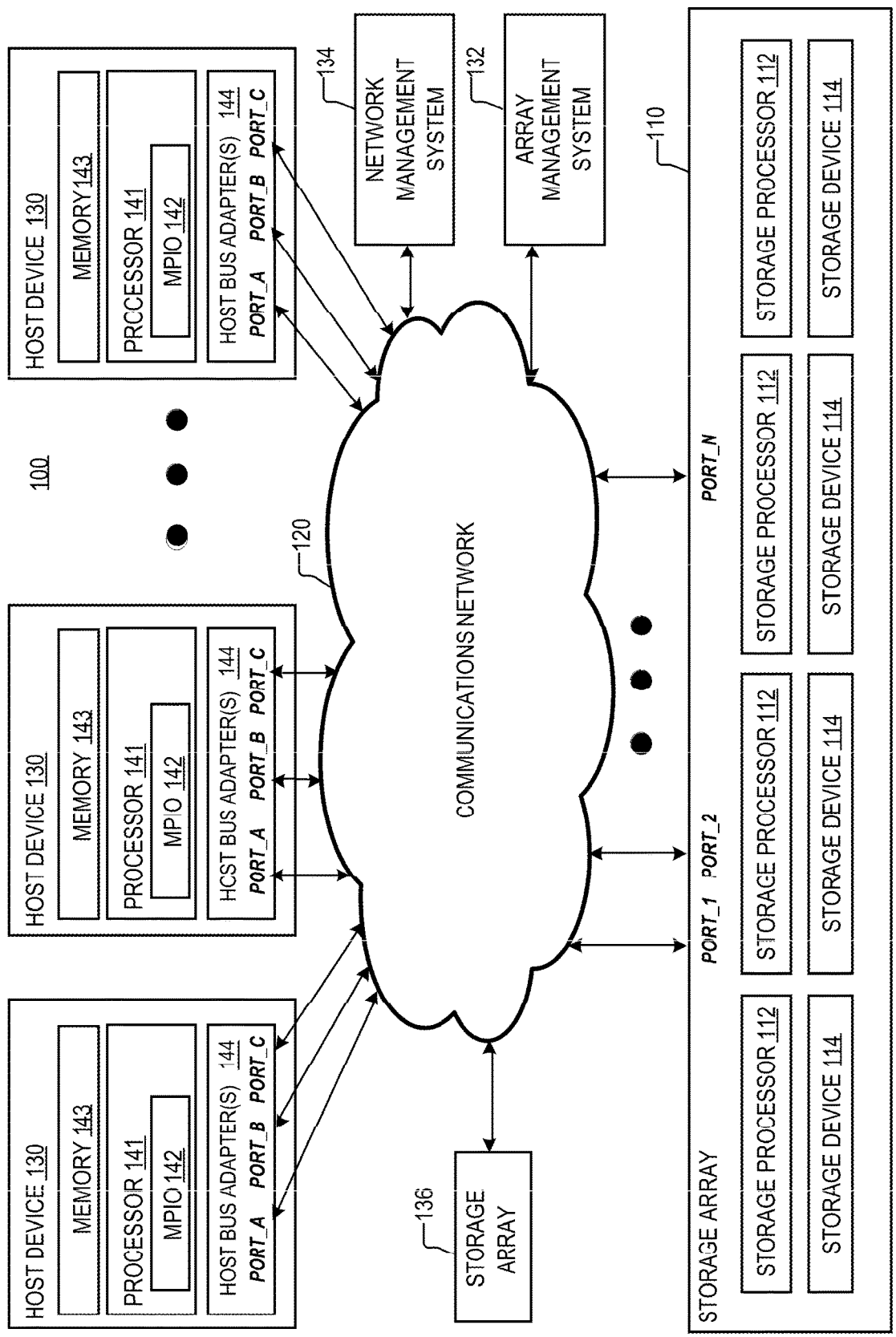
FIG. 1 is a diagram of an example of a system, according to aspects of the disclosure.

FIG. 1 is a diagram of an example of a system 100, according to aspects of the disclosure. As illustrated, the system 100 may include a storage array 110, a communications network 120, a plurality of host devices 130, an array management system 132, a network management system 134, and a storage array 136.

Figure 6:
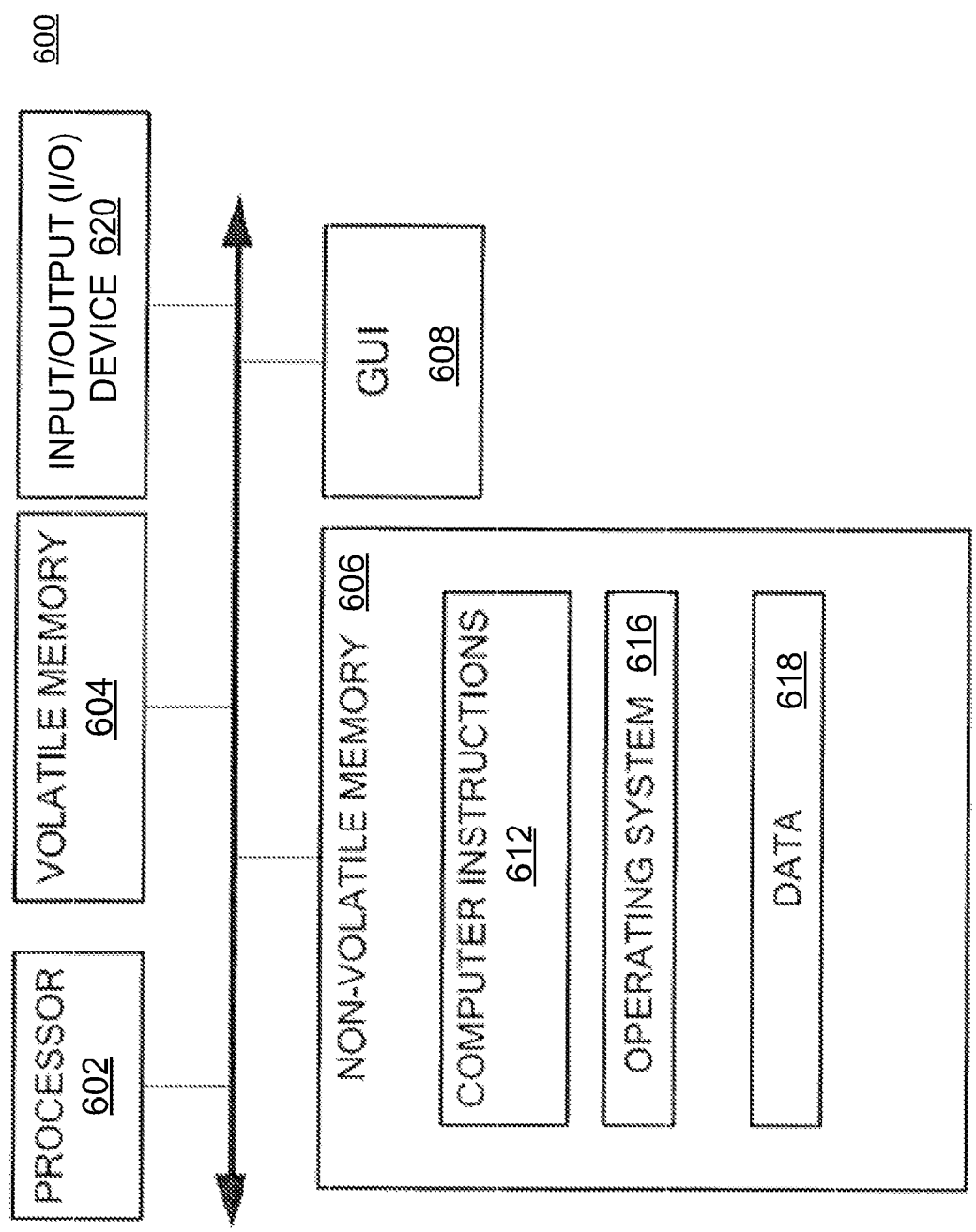
FIG. 6 is a diagram of an example of a computing device, according to aspects of the disclosure.

The storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to the storage devices 114. In some implementations, each of the storage processors 112 may have an architecture that is the same or similar to the architecture of the computing device 600, which is shown in FIG. 6. The storage processors 112 may be located in the same geographic location or in different geographic locations. Similarly, the storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant Array(s) of Independent Disks (RAID) arrays. The communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in the storage arrays 110 and 136. Each host device 130 may include a memory 143, a processor 141, and one or more host bus adapters (HBAs) 144. The memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to the storage array 110 (and/or storage array 136). In other words, each of the HBAs 144 may include a communications interface for connecting to the communications network 120, storage array 110 and/or storage array 136. Although in the example of FIG. 1 each of the host devices 130 is provided with at least one HBA 144, alternative implementations are possible in which the each of the host devices is provided with another type of communications interface, in addition to (or instead of) an HBA. The other type of communications interface may include one or more of an Ethernet adapter, an WiFi adapter, a local area network (LAN) adapter, etc.

Each processor 141 may be configured to execute a multi-path I/O (MPIO) driver 142. The MPIO driver 142 may comprise, for example, PowerPath TM drivers from Dell EMC TM, and/or other types of MPIO drivers that are arranged to discover available communications paths between any of the host devices 130 and the storage array 110. The MPIO driver 142 may be configured to select I/O operations from any of the I/O queues of the host devices 130. The sources of the I/O operations stored in the I/O queues may include respective processes of one or more applications executing on the host devices 130.

The HBA 144 of each of the host devices 130 may include one or more ports. Specifically, in the example of FIG. 1, the HBA 144 of each of the host devices 130 includes three ports, which are herein enumerated as "port A", "port B", and "port C". Furthermore, the storage array 110 may also include a plurality of ports. In the example of FIG. 1, the ports in the storage array 110 are enumerated as "port 1", "port 2," and "port N", where N is a positive integer greater than 2. Each of the ports in the host devices 130 may be coupled to one of the ports of the storage array via a corresponding network path. The corresponding network path may include one or more hops in the communications network 120. Under the nomenclature of the present disclosure, a network path spanning between an HBA port of one of host devices 130 and one of the ports of the storage array 110 is referred to as a "network path of that host device 130".

In any of the host devices 130, the MPIO driver 142 may measure the response time a SCSI/NVMeTCP command takes on each of the network paths of the host device 130. The response times may be measured by sending a respective storage array network response time (SAN RT) command from each (or at least some) of the HBA ports of the host device 130 to each port on the storage array 110. According to the present example, the SAN RT command, when executed by the storage array 110, causes the storage array 110 to transmit an indication of the response time of the path over which the SAN RT command is transmitted. According to the present example, the SAN RT command is not processed in the normal "command processing flow" of storage array 110, meaning that it will never be queued. Thus, the travel time of the SAN RT command is as close as possible to the actual time it takes a command to travel on the network path via which the SAN RT command is transmitted. The MPIO driver 142 may present the response times that are reported as a result of executing the SAN RT commands to the host device 130 (or its user). The response times may be used to track changes in the latency of the communications network 120 and/or storage array 110. This functionality of the MPIO driver 142 allows the user to see the response time of the communications network 120 for all paths of the host device 130 on which the MPIO driver 142 is executing. Although in the example of FIG. 1 a SAN RT command is used to measure the response time of different network paths, it will be understood that alternative implementations can be devices in which any other suitable type of ping command is used in place of the SAN RT command to measure the response times of different network paths.

The array management system 132 may include a computing device, such as the computing device 600, which is discussed further below with respect to FIG. 6. The array management system 132 may be used by a storage administrator to re-configure the storage array 110 when degraded performance of the storage array 110 is detected.

The network management system 134 may include a computing device, such as the computing device 600, which is discussed further below with respect to FIG. 6. The network management system 134 may be used by a network administrator to configure the communications network 120 when degraded performance of the communications network 120 is detected.

The storage array 136 may be the same or similar to the storage array 110. The storage array 136 may be configured to store the same data as the storage array 110. The storage array 136 may be configured to operate in either active-active configuration with the storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledged for as long the data associated with write request is written to the given one of the storage arrays 110 and 136 before the writing to the other one of the storage arrays is completed.

Figure 2:
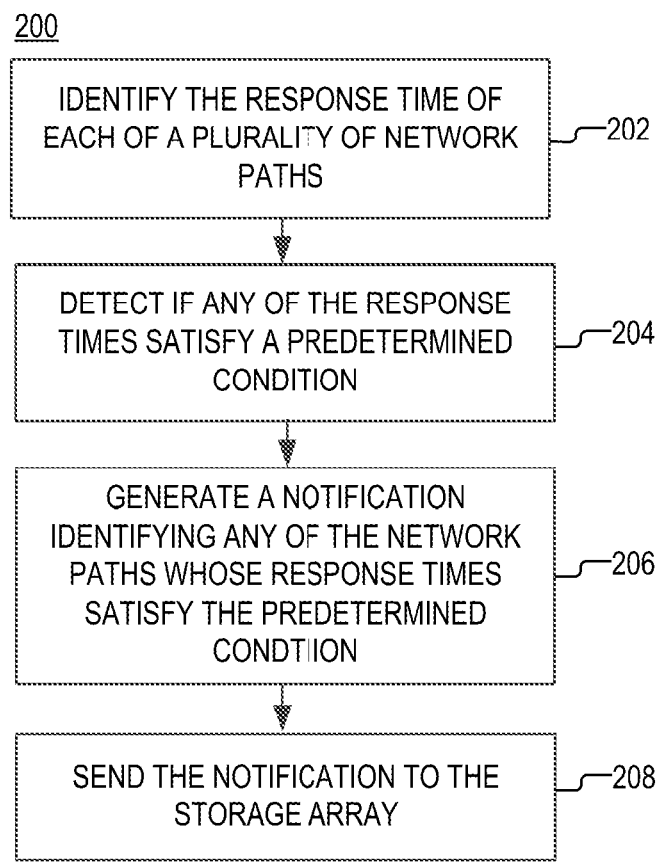
FIG. 2 is a flowchart of an example of a process, according to aspects of the disclosure.

FIG. 2 is a flowchart of an example of a process 200, according to aspects of the disclosure. According to the present example, the process 200 is performed by one of the host devices 130. However, the present disclosure is not limited to any specific entity performing the process 300.

At step 202, the host device 130 identifies the respective response time of each of a plurality of network paths of the host device 130. As discussed above, the host device 130 may determine the response times by using the SAN RT command. However, it will be understood that the present disclosure is not limited to any specific command being used to determine the response times.

At step 204, the host device 130 detects if any given one of the response times satisfies a predetermined condition. The predetermined condition may be any condition which, if satisfied, would indicate that the given response time is abnormally high. In one example, the predetermined condition is satisfied when the given response time is the largest one among the response times identified at step 202. Additionally or alternatively, the predetermined condition may be satisfied if the given response time is the largest one of the response times (determined at step 202) and exceeds the next largest response time by a predetermined distance. Additionally or alternatively, the predetermined condition may be satisfied if the difference between the given response time and the median (of some or all) of the response times (determined at step 202) exceeds a predetermined threshold. Additionally or alternatively, the predetermined response time may be satisfied if the difference between the response time and the average (of some or all) of the response times (determined at step 202) exceeds a predetermined threshold.

At step 206, the host device 130 generates a notification identifying any of the plurality of network paths (of the host device 130) whose respective response times satisfy the predetermined condition. The host device 130 may transmit the notification to the network management system 134. As noted above, each path may be span between an HBA port of the host device 130 and a port on the storage array 110. In this regard, in some implementations, each of the plurality network paths whose respective response time satisfies the predetermined condition may be identified in the notification by one or both of the network path's respective host device port or the network path's respective storage array port.

At step 208, the host device 130 sends the response times to the storage array 110 for further processing. Sending the response times to the storage array 110 may include sending the response times to any computing device that is part of the storage array 110, such as a storage processor, a computing device that used for managing or monitoring the storage array 110, etc. Although in the present example steps 204 and 206 are performed by the host device 130, alternative implementations are possible in which steps 204 and 206 are performed by the storage array 110.

In some implementations, the response times collected at step 202 may be used to determine which one of the storage arrays is local to the host device 130 (executing the process 200). For example, the plurality of response times (determined at step 202) may be provided to the array management system 132 by either the host device 130 or the storage array 110. Next, the host device 130 may determine another plurality of response times, where each response time corresponds to a different network path between the host device 130 and the storage array 136. The other plurality of response times may also be provided to the array management system 132 by either the host device 130 or the storage array 136. Afterwards, based on the two pluralities of response times, the array management system 132 may determine which one of the storage arrays 136 and 110 has a lower latency with respect to the host device 130, and designate this storage array as local to the host device 130. For example, the array management system 132 may determine the respective average of each plurality of response times, and designate as local the storage array whose response times have the lower average. Designating one of the storage arrays 110 and 136 as local may cause I/O requests originating from the host device 130 to be routed to the designated storage array (rather than the other storage array), when the storage arrays 110 and 136 are operated in an active-active configuration.

Figure 3:
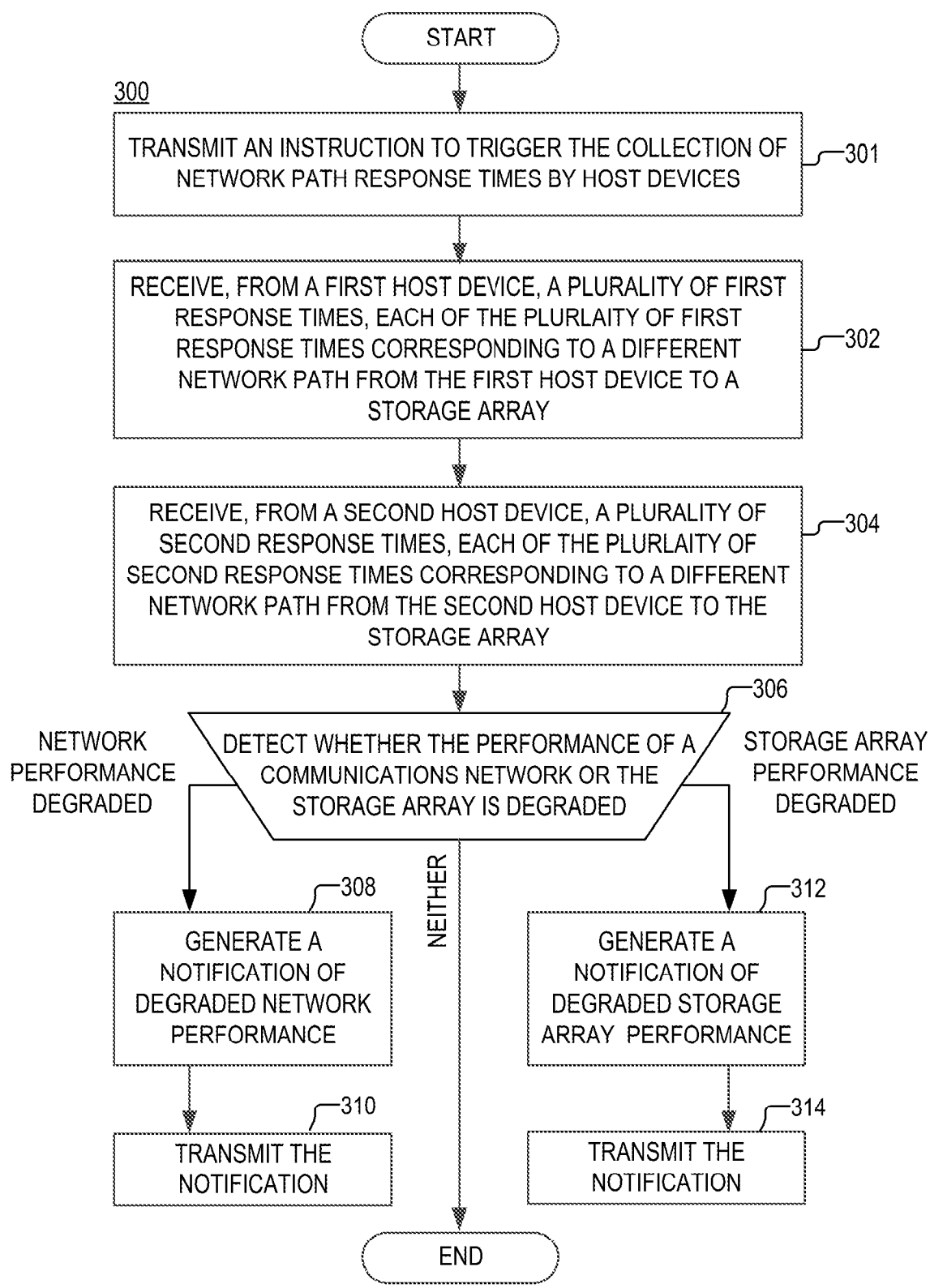
FIG. 3 is a flowchart of an example of a process, according to aspects of the disclosure.

FIG. 3 is a flowchart of an example of a process 300, according to aspects of the disclosure. According to the present example, the process 300 is executed by the storage array 110. However, the present disclosure is not limited to any specific entity executing the process 300. For example, in some implementations, the process 300 may be performed by a computing device, such as the computing device 600, which is discussed further below with respect to FIG. 6.

According to the example of FIG. 3, the process 300 is executed for the purposes of diagnosing a problem of a user of a first host device 130. From the user's perspective, the problem is manifested as the storage array 110 taking too long to execute I/O requests originating from the user or not executing the I/O requests at all. The process 300 is executed for the purpose of diagnosing which one of two possible causes is more likely to be the true cause of the user's problem. Specifically, the process 300 may be executed to determine if the user's problem is more likely to be caused as a result of the performance of the communications network 120 being degraded or as a result of the performance of the storage array 110 being degraded. The term "degraded network performance" refers to any misconfiguration or error in the network 120 which causes the communications network 120 to drop I/O requests or (or other packets) or deliver slowly the I/O requests (or packets). The term "degraded storage array performance" refers to any misconfiguration or error in a host device and/or any misconfiguration or error in the storage array 110 which causes the storage array 110 to not receive or not properly process I/O requests for the storage array 110, which the user sends through one of the host devices 130.

At step 301, the storage array transmits an instruction that triggers the collection of network path response times by two or more of the host devices 130. According to the present example, the instructions is transmitted to the first host device 130 and a second one of the host devices 130. When received by any of the first host device 130 or the second host device 130, the instruction may cause the host device 130 to perform the following functions: (i) identify a plurality of network paths that connect the host device 130 to the storage array 110, and (ii) determine the respective response time of each of the plurality of network paths.

At step 302, the storage array 110 receives, from the first host device 130, a plurality of response times. Each of the plurality of response times corresponds to a different network path of the first host device 130. Each of the plurality of response times may be determined in the manner discussed above with respect to step 202 of the process 200.

At step 304, the storage array receives from the second host device 130 a plurality of response times. Each of the plurality of response times corresponds to a different network path of the second host device 130. Each of the plurality of response times may be determined in the manner discussed above with respect to step 202 of the process 200.

At step 306, the storage array 110 detects whether the performance of the communications network 120 or the storage array 110 is degraded. In some implementations, the determination can be made in accordance with any of processes 400A, 400B, and 500, which are discussed further below with respect to FIGS. 4A-6. If it is determined that the performance of the storage array 110 is degraded, the process 300 proceeds to step 308. Otherwise, the process 300 proceeds to step 312.

At step 308, the storage array generates a notification of degraded network performance. The notification may include an identifier of a network path that exhibits high latency and/or any other suitable type of information.

At step 310, the storage array 110 transmits the notification of degraded network performance to a network administrator. In some implementations, transmitting the notification of degraded network performance to a network administrator may include transmitting the notification to the network management system 134. Additionally or alternatively, in some implementations, transmitting the notification of degraded network performance may include performing a search of a database or directory (not shown) to obtain an identifier corresponding to the network administrator and transmitting the notification based on the obtained identifier. The identifier corresponding to the network administrator may include the IP address of the network management system 134, an email address of the network administrator, an employee ID of the network administrator, and/or any other suitable type of identifier.

At step 312, the storage array generates a notification of degraded storage array performance. The notification may include an identifier of a network path that exhibits high latency and/or any other suitable type of information.

At step 314, the storage array 110 transmits the notification of degraded storage array performance to a storage administrator. In some implementations, transmitting the notification of degraded storage array performance to a storage administrator may include transmitting the notification to the array management system 132. Additionally or alternatively, in some implementations, transmitting the notification of degraded storage array performance may include performing a search of a database or directory (not shown) to obtain an identifier corresponding to the storage administrator and transmitting the notification based on the obtained identifier. The identifier corresponding to the storage administrator may include the IP address of the array management system 132, an email address of the storage administrator, an employee ID of the storage administrator, and/or any other suitable type of identifier.

Under the nomenclature of the present disclosure, an action is performed by the storage array 110 when the action is performed by a computing device which is part of the storage array 110. Such a computing device may be a one of the storage processors 112, a computing device that is configured to monitor the storage array 110, and/or any computing device that is arranged to identify two or more host devices that are connected to the storage array 110 and transmit to the identified host devices a request for the response times of the network paths of the host devices.

FIG. 4A is a flowchart of an example of a process 400A, according to aspects of the disclosure. According to the present example, the process 400A is performed by the storage array 110. However, the present disclosure is not limited to any specific entity executing the process 400A. For example, in some implementations, the process 400A may be performed by a computing device, such as the computing device 600, which is discussed further below with respect to FIG. 6.

At step 402, the storage array 110 determines a first parameter of the plurality of first response times (received at step 302). The first parameter may include one or more of the median of the one or more response times, the average of the one or more response times, the standard deviation of the distribution of the first response times, and/or any other suitable characteristic of the distribution of the first response times.

At step 404, the storage array 110 determines a second parameter of the plurality of second response times (received at step 304). The second parameter may include one or more of the median of the one or more response times, the average of the one or more response times, the standard deviation of the distribution of the second response times, and/or any other suitable characteristic of the distribution of the second response times.

At step 406, the storage array 110 compares the first parameter to the second parameter to determine whether the performance of the storage array 110 is degraded. In some implementations, the storage array 110 may determine the difference between the first parameter and the second parameter and determine whether the difference exceeds a threshold. If the difference exceeds the threshold, the storage array may determine that the performance of the storage array 110 is degraded.

Figure 4B:
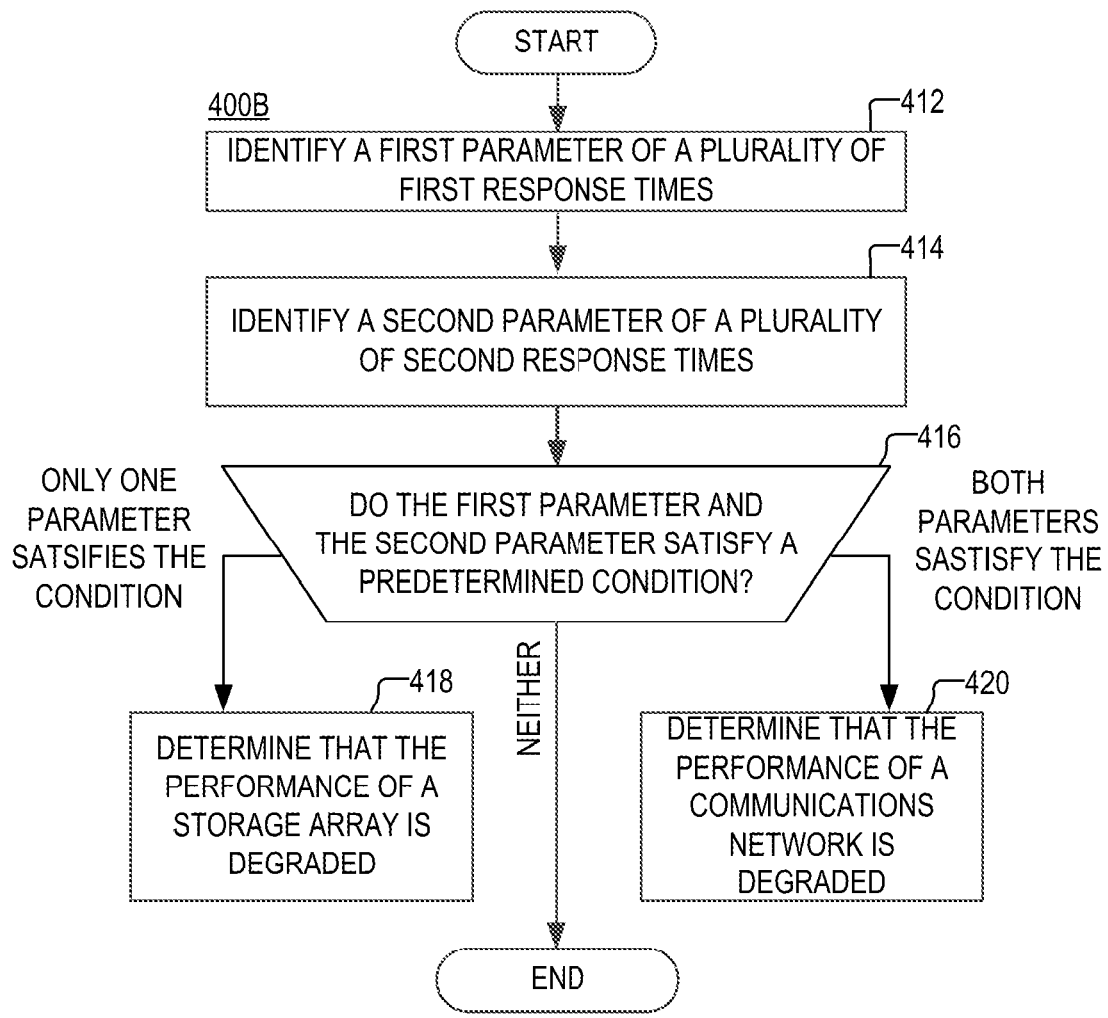
FIG. 4B is a flowchart of an example of a process, according to aspects of the disclosure.

FIG. 4B is a flowchart of an example of a process 400B, according to aspects of the disclosure. According to the present example, the process 400B is performed by the storage array 110. However, the present disclosure is not limited to any specific entity executing the process 400B. For example, in some implementations, the process 400B may be performed by a computing device, such as the computing device 600, which is discussed further below with respect to FIG. 6.

At step 412, the storage array 110 determines a first parameter of the plurality of first response times (received at step 302). The first parameter may include one or more of the median of the one or more response times, the average of the one or more response times, the standard deviation of the distribution of the first response times, and/or any other suitable characteristic of the distribution of the first response times.

At step 414, the storage array 110 determines a second parameter of the plurality of second response times (received at step 304). The second parameter may include one or more of the median of the one or more response times, the average of the one or more response times, the standard deviation of the distribution of the second response times, and/or any other suitable characteristic of the distribution of the second response times.

At step 416, the storage array 110 detects whether the first parameter and the second parameter satisfy a predetermined condition. In one implementation, the condition may be satisfied by the first parameter if the first parameter is greater than a predetermined threshold. Similarly, the condition may be satisfied by the second parameter if the second parameter exceeds the predetermined threshold. If the condition is satisfied by only one of the first parameter or the second parameter, the process 400B proceeds to step 418. Otherwise, if the condition is satisfied by both the first parameter and the second parameter, the process 400B proceeds to step 420. If neither of the first parameter and the second parameter satisfies the condition, the process 400B ends.

At step 418, the storage array 110 determines that the performance of the storage array 110 is degraded.

At step 420, the storage array 110 determines that the performance of the communications network 120 is degraded.

Figure 5:
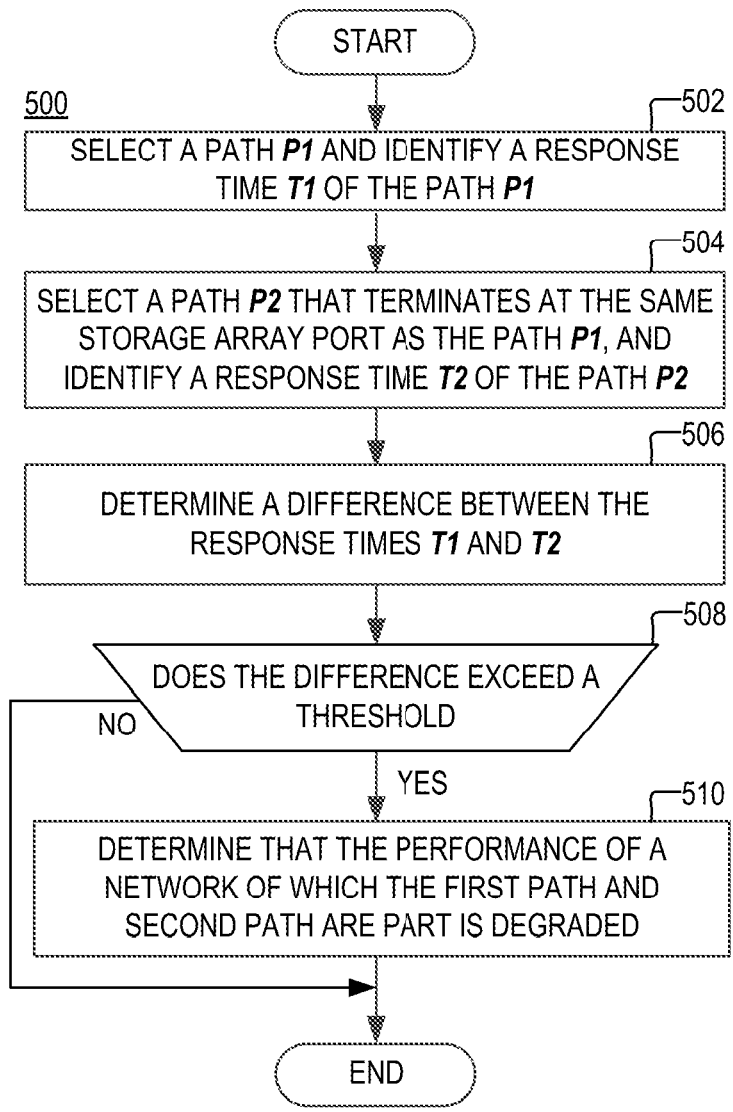
FIG. 5 is a flowchart of an example of a process, according to aspects of the disclosure.

FIG. 5 is a flowchart of an example of a process 500, according to aspects of the disclosure. According to the present example, the process 500 is performed by the storage array 110. However, the present disclosure is not limited to any specific entity executing the process 500. For example, in some implementations, the process 500 may be performed by a computing device, such as the computing device 600, which is discussed further below with respect to FIG. 6.

At step 502, the storage array 110 selects a network path P1 and identifies the response time T1 of the path P1. According to the present example, the network path P1 is one of the plurality of first network paths whose response times are received at step 302 (shown in FIG. 3).

At step 504, the storage array 110 selects a network path P2 and identifies the response time T2 of the path P2. According to the present example, the network path P2 is one of the plurality of the second network paths whose response times are received at step 304 (shown in FIG. 3).

At step 506, the storage array 110 determines a difference between the response times T1 and T2.

At step 508, the storage array 110 determines whether the difference exceeds a predetermined threshold. If the difference exceeds the threshold, the process 500 proceeds to step 510. Otherwise, the process 500 ends.

At step 510, the storage array 110 determines that the performance of the communications network of which the network paths P1 and P2 are part is degraded. According to the present example, the storage array 110 determines that the performance of the communications network 120 is degraded.

Although in the example of FIG. 5 the storage array 110 selects only one path P1, alternative implementations are possible in which a plurality of network paths P1 is selected, wherein each of the plurality of paths P1 starts at a different HBA port of a first host device 130 and terminates at the same storage array port. In such implementations, the response time T1 determined at step 502 may be the average (and/or median) of the response times of the network paths P1. Although in the example of FIG. 5 the storage array 110 selects only one path P2, alternative implementations are possible in which a plurality of paths P2, wherein each of the plurality of paths P2 starts at a different HBA port of a second host device and terminates at the same storage array port. In such implementations, the response time T2 determined at step 504 may be the average (and/or median) of the response times of the network paths P2.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   receiving a plurality of first response times, each of the plurality of first response times corresponding to a different one of a plurality of first network paths between a first host device and a first storage array, the plurality of first response times being received from the first host device;
   receiving a plurality of second response times, each of the plurality of second response times corresponding to a different one of a plurality of second network paths between a second host device and the first storage array, the plurality of second response times being received from the second host device; and
   processing the plurality of first response times and the plurality of second response times;
   wherein the plurality of first network paths and the plurality of second network paths are part of a communications network.

2. The method of claim 1, wherein processing the plurality of first response times and the plurality of second response times includes:
   detecting whether any of a performance of the communications network and a performance of the first storage array is degraded based on the plurality of first response times and the plurality of second response times;
   transmitting, to a first destination, a notification of degraded network performance, the notification of degraded network performance being transmitted in response to detecting that the performance of the communications network is degraded;
   transmitting, to a second destination, a notification of degraded storage array performance, the notification of degraded storage array performance being transmitted in response to detecting that the performance of the first storage array is degraded.

3. The method of claim 1, wherein processing the plurality of first response times and the plurality of second response times includes:
   detecting whether the corresponding response time of a given one of the plurality of first network paths exceeds, by a predetermined threshold, the corresponding response time of a given one of the plurality of second network paths, the given second network path terminating at a same first storage array port as the given first network path; and
   generating a notification that is indicative of a degraded performance of the communications network, the notification being generated when the corresponding response time of the given first network path exceeds the corresponding response time of the given second network path by the predetermined threshold.

4. The method of claim 1, wherein processing the plurality of first response times and the plurality of second response times includes:
   identifying a first parameter of the plurality of first response times;
   identifying a second parameter of the plurality of second response times;
   detecting whether a difference between the first parameter and the second parameter exceeds a threshold; and
   generating a notification that is indicative of a degraded performance of the communications network, the notification being generated when the difference exceeds the threshold.

5. The method of claim 1, wherein processing the plurality of first response times and the plurality of second response times includes:
   identifying a first parameter of the plurality of first response times;
   identifying a second parameter of the plurality of second response times;
   detecting whether both the first parameter and the second parameter satisfy a predetermined condition; and
   generating a notification that is indicative of a degraded performance of the first storage array, the notification being generated when both the first parameter and the second parameter satisfy the predetermined condition.

6. The method of claim 1, wherein processing the plurality of first response times and the plurality of second response times includes:
- receiving, at a management system, the plurality of first response times and the plurality of second response times;
- receiving, at the management system, a plurality of third response times, each of the plurality of third response times corresponding to a different one of a plurality of third network paths between the first host device and a second storage array;
- selecting one of the first storage array and the second storage array based on at least one of the pluralities of first and third response times; and
- designating the selected one of the first storage array and the second storage array as local to the first host device.

7. The method of claim 6, wherein the first host device and the second host device are part of a same initiator group, and designating one of the first storage array and the second storage array as local to the first host device and the second host device includes mapping an identifier of the initiator group to an identifier of the selected one of the first storage array and the second storage array.

8. The method of claim 1, wherein processing the plurality of first response times and the plurality of second response times includes:
- detecting whether the corresponding response time of a given one of the plurality of first network paths exceeds, by a predetermined threshold, the corresponding response time of another one of the plurality of first network paths; and
- generating a notification that is indicative of a degraded performance of the communications network, the notification being generated when the corresponding response time of the given first network path exceeds the corresponding response time of the other one of the plurality of first network paths by the predetermined threshold.

9. The method of claim 1, further comprising:
- determining, by the first host device, the plurality of first response times, each of the plurality of first response times being determined by transmitting to the first storage array a plurality of first Storage Area Network Response Time (SAN RT) messages, each of the plurality of first SAN RT messages being transmitted over a different one of the plurality of first network paths; and
- determining, by the second host device, the plurality of second response times, each of the plurality of second response times being determined by transmitting to the first storage array a plurality of second Storage Area Network Response Time (SAN RT) messages, each of the plurality of second SAN RT messages being transmitted over a different one of the plurality of second network paths.

10. The method of claim 1, further comprising:
- detecting, by the first host device, whether each respective one of the plurality of first response times satisfies a predetermined condition, the predetermined condition being used to detect whether the respective first response time is abnormally higher than the rest of the plurality of first response times;
- generating a notification identifying any of the first network paths whose corresponding first response times satisfy the predetermined condition.

11. A storage array, comprising:
a memory;
at least one processor that is operatively coupled to the memory, the at least one processor being configured to perform the operations of;
- receiving a plurality of first response times, each of the plurality of first response times corresponding to a different one of a plurality of first network paths between a first host device and the first storage array, the plurality of first response times being received from the first host device;
- receiving a plurality of second response times, each of the plurality of second response times corresponding to a different one of a plurality of second network paths between a second host device and the first storage array, the plurality of second response times being received from the second host device; and
- processing the plurality of first response times and the plurality of second response times;
- wherein the plurality of first network paths and the plurality of second network paths are part of a communications network.

12. The storage array of claim 11, wherein processing the plurality of first response times and the plurality of second response times includes:
- detecting whether any of a performance of the communications network and a performance of the first storage array is degraded based on the plurality of first response times and the plurality of second response times;
- transmitting, to a first destination, a notification of degraded network performance, the notification of degraded network performance being transmitted in response to detecting that the performance of the communications network is degraded;
- transmitting, to a second destination, a notification of degraded storage array performance, the notification of degraded storage array performance being transmitted in response to detecting that the performance of the first storage array is degraded;
- wherein the first destination is associated with an administrator of the communications network, and the second destination is associated with an administrator of the first storage array.

13. The storage array of claim 11, wherein processing the plurality of first response times and the plurality of second response times includes:
- detecting whether the corresponding response time of a given one of the plurality of first network paths exceeds, by a predetermined threshold, the corresponding response time of a given one of the plurality of second network paths, the given second network path terminating at a same first storage array port as the given first network path; and
- generating a notification that is indicative of a degraded performance of the communications network, the notification being generated when the corresponding response time of the given first network path exceeds the corresponding response time of the given second network path by the predetermined threshold.

14. The storage array of claim 11, wherein processing the plurality of first response times and the plurality of second response times includes:
- identifying a first parameter of the plurality of first response times;
- identifying a second parameter of the plurality of second response times;
- detecting whether a difference between the first parameter and the second parameter exceeds a threshold; and generating a notification that is indicative of a degraded performance of the communications network, the notification being generated when the difference exceeds the threshold.

15. The storage array of claim 11, wherein processing the plurality of first response times and the plurality of second response times includes:
identifying a first parameter of the plurality of first response times;
identifying a second parameter of the plurality of second response times;
detecting whether both the first parameter and the second parameter satisfy a predetermined condition; and
generating a notification that is indicative of a degraded performance of the first storage array, the notification being generated when both the first parameter and the second parameter satisfy the predetermined condition.

16. A non-transitory computer-readable medium storing one or more processor-executable instructions, which, when executed by one or more processors of a first storage array, cause the first storage array to perform the operations of:
receiving a plurality of first response times, each of the plurality of first response times corresponding to a different one of a plurality of first network paths between a first host device and the first storage array, the plurality of first response times being received from the first host device;
receiving a plurality of second response times, each of the plurality of second response times corresponding to a different one of a plurality of second network paths between a second host device and the first storage array, the plurality of second response times being received from the second host device; and
processing the plurality of first response times and the plurality of second response times;
wherein the plurality of first network paths and the plurality of second network paths are part of a communications network.

17. The non-transitory computer-readable medium of claim 16, wherein processing the plurality of first response times and the plurality of second response times includes:
detecting whether any of a performance of the communications network and a performance of the first storage array is degraded based on the plurality of first response times and the plurality of second response times;
transmitting, to a first destination, a notification of degraded network performance, the notification of degraded network performance being transmitted in response to detecting that the performance of the communications network is degraded;
transmitting, to a second destination, a notification of degraded storage array performance, the notification of degraded storage array performance being transmitted in response to detecting that the performance of the first storage array is degraded.

18. The non-transitory computer-readable medium of claim 16, wherein processing the plurality of first response times and the plurality of second response times includes:
detecting whether the corresponding response time of a given one of the plurality of first network paths exceeds, by a predetermined threshold, the corresponding response time of a given one of the plurality of second network paths, the given second network path terminating at a same first storage array port as the given first network path; and
generating a notification that is indicative of a degraded performance of the communications network, the notification being generated when the corresponding response time of the given first network path exceeds the corresponding response time of the given second network path by the predetermined threshold.

19. The non-transitory computer-readable medium of claim 16, wherein processing the plurality of first response times and the plurality of second response times includes:
identifying a first parameter of the plurality of first response times;
identifying a second parameter of the plurality of second response times;
detecting whether a difference between the first parameter and the second parameter exceeds a threshold; and
generating a notification that is indicative of a degraded performance of the communications network, the notification being generated when the difference exceeds the threshold.

20. The non-transitory computer-readable medium of claim 16, wherein processing the plurality of first response times and the plurality of second response times includes:
identifying a first parameter of the plurality of first response times;
identifying a second parameter of the plurality of second response times;
detecting whether both the first parameter and the second parameter satisfy a predetermined condition; and
generating a notification that is indicative of a degraded performance of the first storage array, the notification being generated when both the first parameter and the second parameter satisfy the predetermined condition.

* * * * *